Feb. 6, 1945.  W. J. KIENE  2,368,927
VALVE
Filed Dec. 30, 1943
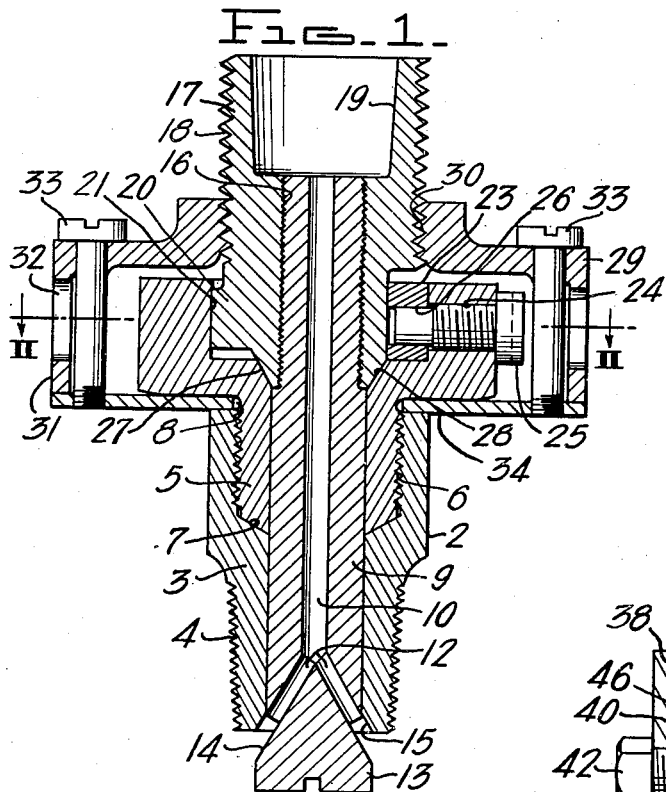
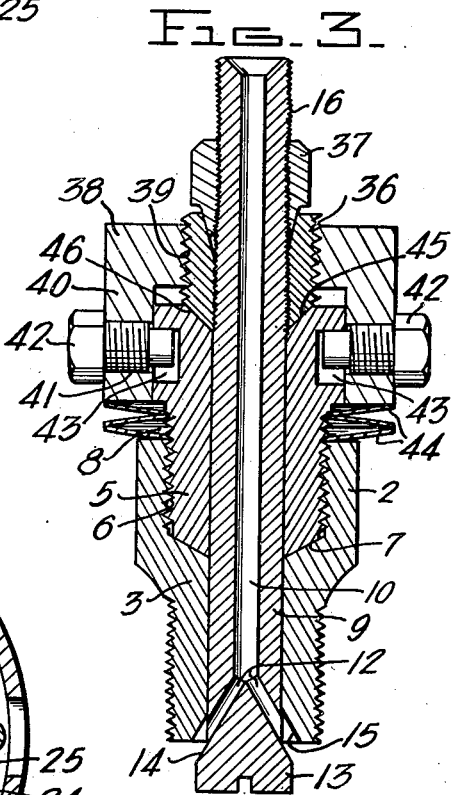
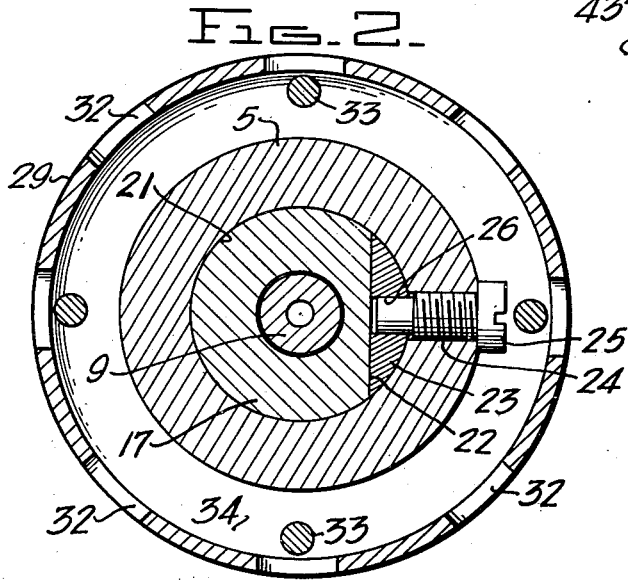
INVENTOR:
WILLIAM J. KIENE,
BY: Ralph E. Meech
ATTORNEY.

Patented Feb. 6, 1945

2,368,927

UNITED STATES PATENT OFFICE 2,368,927

VALVE

William J. Kiene, Chicago, Ill., assignor to Dorothy S. Kiene, Chicago, Ill.

Application December 30, 1943, Serial No. 516,209

14 Claims. (Cl. 251—8)

This invention relates to valves and, particularly to an improved valve which is adapted to be used especially for connecting an indicator or gage to an internal combustion engine, such as a Diesel engine for determining the pressure in the cylinders thereof.

It is the general practice to connect a pressure indicator or other type of gage to the cylinders of internal combustion engines, such as Diesels and the like in order to determine the compression in the various cylinders so that the efficiency of the engine can then be ascertained. It is preferable to connect the indicator or gage to the cylinders by means of a valve so that pressure of the gases issuing forth from the cylinders can be cut off after the pressure has been recorded.

Heretofore, various types of valves have been suggested and used for such a purpose but most of these are unsatisfactory in their use primarily for the reason that the parts thereof are subject to expansion and contraction due to the heat and pressure from the cylinders. For example, an outward closing valve tends to lock, and an inward closing valve tends to slack off or loosen, when the respective valves are closed. The lower portion of the valve stem and the valve of such valves heat up to a greater extent than any other portion of the valve when in use, and consequently contract more when the valve is closed. Such a condition is not only inconvenient for the operator, but the expansion and contraction of the valve parts placed undue strain thereon and oftentimes resulted in failure thereof which necessitated replacement of the parts or of the complete valve. Also, at times the valve would tend to slack off and open accidently thereby reducing the working compression of the cylinder which also was unsatisfactory.

Accordingly, it is the general object of the present invention to provide an improved valve for connecting a gage or pressure indicator to the cylinder of an internal combustion engine and the like which compensates for any expansion or contraction of the valve parts due to heat transmitted thereto.

It is another object of the invention to provide an improved valve in which the valve head is at all times urged to its seat and held yieldably in engagement therewith when the valve is in its fully closed position so as to prevent accidental opening thereof.

It is a further object of the invention to provide an improved valve in which the escape of gases or fluid around the valve stem is effectively prevented when the valve is in its fully open position.

It is still another object of the present invention to provide an improved valve which is simple and compact in its construction, and, at the same time, efficient and effective in its use.

It is still a further object of this invention to provide an improved valve which can be conveniently and inexpensively made and assembled from parts which can be easily and quickly machined and fabricated, thereby reducing the cost of the valve to a minimum.

Various other objects and advantages of this invention will be more apparent in the course of the following specification and will be particularly pointed out in the appended claims.

In the accompanying drawing there is shown, for the purpose of illustration, one embodiment and a modification thereof which my invention may assume in practice.

In the drawing:

Figure 1 is a longitudinal sectional view through the improved valve of my invention;

Figure 2 is a sectional view taken on line II—II of Figure 1; and

Figure 3 is a longitudinal sectional view through a modified form of valve in accordance with my invention.

Referring more particularly to the drawing, the improved valve of my invention comprises a tubular body member 2 preferably consisting of two parts, an inner portion 3 having an exteriorly threaded portion 4 arranged on the outer end thereof by means of which the valve is adapted to be connected to an adapter or directly to the cylinder of the internal combustion engine with which it is adapted to be used. The other part of the body member consists of an outer portion or bonnet 5 which is connected to the inner end of the portion 3 by means of the thread connection 6. The outer portion 5 is screwed tightly into the inner portion 3 so as to provide a gas tight seat as at 7. The inner portion 3 and the outer portion 5 are constructed and arranged so as to provide an annular or circumferential space or groove 8 around the periphery of the body member intermediate the length thereof for a purpose hereinafter to be described.

There is arranged through the bore or axial opening of the two parts 3 and 5 of the body member 2, a longitudinally extending valve stem 9 which has a sliding fit with the bore thereof and is arranged for reciprocable movement relative thereto. There is arranged axially through the valve stem 9, a passageway 10 which terminates adjacent the inner end of the valve stem and communicates with a plurality of angularly arranged port holes 12 positioned in the side walls thereof so as to provide a tubular valve stem. On the inner end of the valve stem adjacent the port holes 12, there is arranged a valve head 13 preferably having an annular tapered or beveled portion 14 which cooperates with a similar annular tapered or beveled portion 15 arranged around the outer end of the bore of the inner part 3 of the body member in order to close the valve. The outer end of the valve stem extends beyond the outer part 5 of the body member and is exteriorly threaded as at 16.

In the preferred embodiment of my invention, as shown in Figures 1 and 2 of the drawing, there is securely arranged on the extending threaded portion 16 of the valve stem, a connecting member 17 which is exteriorly threaded as at 18 and preferably has a circular socket portion 19 arranged in the outer end thereof. The pressure indicator or gage is adapted to be screwed on the threaded portion 18 and fits into the socket portion 19.

There is arranged on the inner end of the connecting member 17, an annular flange portion 20 which fits into an enlarged bore 21 arranged in the outer end of the outer part 5 of the body member. As shown in Figure 2 of the drawing, one side of the flange portion 20 is cut away so as to provide a flat surface as at 22, and there is disposed in the space provided by this cutaway portion and within the bore 21, a segmental insert member 23. In the side wall of the outer part 5 of the body member directly opposite the enlarged bore 21 therein, there is arranged in a threaded hole 24 in which there is threaded a machine screw 25 with the inner end thereof disposed in a hole 26 arranged centrally through the segmental insert member 23 which is provided for a purpose hereinafter to be described.

The extreme inner end of the connecting member 17 is preferably annularly beveled or tapered as at 27 which tapered surface cooperates with a similar annular tapered or beveled surface 28 arranged on the outer end of the smaller bore portion of the outer part 5 of the body member when the valve is in its open position so as to provide a gas tight seat between these parts whereby escapement of the gases between the valve stem and the body member is prevented.

There is arranged on the exteriorly threaded portion 18 of the connecting member 17, a rotatable hand wheel or other suitable manipulating member 29 for moving the valve stem reciprocably relative to the body member 2. The hand wheel 29 has an interiorly threaded portion 30 which cooperates with the threaded portion 18 to move the valve stem 9. There is provided preferably a circumferential flange portion 31 arranged integrally therewith and which extends over and encloses the outer end of the outer part 5 of the body member. There is arranged in the flange portion 31 of the hand wheel, preferably a plurality of spaced apart cylindrical openings 32 for the dual purpose of inserting a tool for manipulating the screw 25 and to aid in cooling the hand wheel.

On the inner side of the hand wheel 29, there is attached to the flange portion 31 thereof, preferably by means of a plurality of screws 33, an annular disk-like member 34 which is preferably inherently resilient so that it will yield when the valve stem is moved either to its open or closed position. The inner periphery of the disk-like member 34 is floatingly disposed in the circumferential space or groove 8 arranged around the body member so as to be freely rotatable relative thereto.

The valve parts are assembled in the following manner. The disk-like member 34 is first positionned on the inner end of the outer part 5 of the body member, and the lower part 3 is then screwed thereto by means of the threaded connection 6 until the cooperating tapered portions at 7 abut each other. When these two parts have been screwed tightly together, it will be understood that the disk-like member 34 is positioned in the space 8 arranged between the connection of these two parts, and that the disk will be free to rotate relative thereto. The valve stem 9 is then inserted through the bore of the parts 3 and 5 of the body member so that the threaded portion 16 extends through and above the outer end of the outer part 5. The connecting member 17 is then screwed onto the threaded portion 16 of the valve stem and the segmental member 23 is positioned in the space against the flat surface and rotates with the connecting member 17 as it is being screwed onto the valve stem. After the connecting member 17 has been tightly screwed thereon and is in the proper position to permit the proper opening and closing of the valve, the connecting member 17 is positioned rotatively so that the hole 26 in the segmental member 23 is disposed directly opposite the screw 25 in the side wall of the enlarged bore of the outer part 5. The screw 25 is then screwed inwardly so that the inner end thereof passes into the opening 26 of the segmental member thereby locking the same in position therein. While the screw 25 holds the segmental member in position, it is not drawn so tight as to force the segmental member against the flat surface 22 so as to bind the same thereon, as it is necessary that the member 17 be movable relative thereto in order to manipulate the valve. In other words, the connecting member 17 is permitted to move longitudinally so as to provide a reciprocable movement for the valve stem but prevented from rotative movement relative thereto by the segmental member 23.

The hand wheel 29 is then screwed onto the threaded portion 18 of the connecting member 17 until the inner side of the flange portion 31 abuts the disk-like member 34. The hand wheel and disk-like member are then connected together by means of the screws 33. In case it is necessary to readjust the valve stem relative to the body member after the valve has been assembled as above described, a screw driver or other suitable tool may be inserted through any one of the openings 32 arranged through the annular flange 31 so as to manipulate the screw 25 thereby permitting the valve stem to be rotated relative to the body member. In other words, the valve may be turned completely around on a seat by removing the screw 25 in case it is desired to rotate the valve head to grind it to its seat or for any other reason.

The improved valve of my invention operates as follows. In order to close the valve, the hand wheel 29 is rotated so as to move the valve stem outwardly due to the cooperation of the threaded portion 18 of the connecting member 17 with the interiorly threaded portion 30 of the hand wheel. The hand wheel is rotated until the annular tapered surface 14 of the valve head 13 abuts the tapered surface 15 on the inner end of the body member 2 so as to firmly seat the same. When the hand wheel is turned, it will be seen that the disk-like member 34 rotates therewith and that the floating connection thereof in the space 8 of the body member provides a flexible bearing therefor. The valve, when in use is preferably tightened so that the valve head 13 is drawn lightly to its seat at 15. The consequent contraction of the valve head and stem tightly closes the valve and the resilient member 34 prevents locking and excessive strain on the parts of the valve as it will be seen that the resilient member continues to exert pressure on the valve stem thereby holding the valve head on its seat. In case the valve is subjected to a relatively high temperature as it usually is when in service, it will be understood that the parts of the valve tend to expand due to the heat, but that the parts will not expand proportionately. However, this unproportionate expansion of the part is compensated for in the valve of the present invention by the yieldable disk-like member 34 which permits the hand wheel together with the connecting member 17 and the valve stem 9 to move relative to the body member 2, and, at the same time, maintains the valve head 13 in its fully seated position.

When it is desired to open the valve, the hand wheel 29 is turned in the opposite direction, and when the valve stem has been moved thereby to its fully open position, as shown in Figure 1 of the drawing, it will be seen that the annular tapered portion 27 of the connecting member 17 abuts the tapered surface 28 on the outer end of the body member 2 so as to prevent leakage of gases from around the valve stem. When the valve stem is in its open position, the valve parts will tend to contract due to cooling thereof and again the parts will not contract proportionately. In such a case, the yieldable member 34 will again compensate for the unproportionate contraction of the parts thereby permitting them to assume their normal position again without subjecting the same to undue strain.

In Figure 3 of the drawing, there is shown a slight modification of the improved valve of my invention. The body member 2 and the valve stem 9 of this modification are constructed in substantially the same manner as the preferred embodiment. However, in this construction, the upper threaded portion 16 of the valve stem 9 extends preferably a substantial distance beyond the outer part 5 of the body member 2, and there is arranged thereon an exteriorly threaded nut-like member 36 and a lock nut 37 which cooperates therewith to securely hold the same in position thereon. The nut-like member 36 is the equivalent of the hand wheel 29 of the preferred construction as it is by the action of this nut that the valve stem 9 is moved to its open and closed positions. In addition, there is provided a cap member 38 having an interiorly threaded hole 39 with the threads thereof cooperating with the exteriorly threaded portion of the nut-like member 36. There is integrally arranged with the cap member 38, an annular flange portion 40 which is disposed over and around the outer end of the outer part 5 of the body member. There is arranged through the flange portion 40, preferably at diametrically opposed positions, a pair of threaded holes 41 in each of which there is disposed a cap screw 42. The inner ends of the cap screws 42 are disposed in diametrically opposed slotted openings 43 arranged in the periphery of the outer part 5. The cap member 38 is held in engagement with the body member 2 by the cap screws 42 and is prevented from rotative movement relative thereto but is permitted to move a limited distance in a longitudinal direction due to the slotted openings 43. In the circumferential space or groove 8 between the two parts of the body member, there is arranged a plurality of resilient conical lock washers 44 which is the equivalent of the resilient disk-like member 34 of the preferred construction. The outermost washer or the outer side of the lock nut bears against the inner side of the flange portion 40 of the cap member 38 at all times.

In this modified construction, the valve stem 9 is rotated when the valve is moved to its open or closed position and is moved relative to the body member 2 due to the cooperation of the exteriorly threaded portion of the nut-like member 36 with the interiorly threaded portion 39 of the cap member. It will be understood that the pressure indicator or gage is connected to the extreme outer end of the threaded portion 16 of the valve stem and that the valve stem is turned by means of the indicator or gage after the same has been tightly screwed in position thereon or the valve stem may be manipulated if desired by turning the nut 37. In other words, this modified valve is designed to operate without the use of a hand wheel, and is operated by turning the indicator or its connection. It is, of course, necessary that the effort necessary to loosen or disengage the indicator be greater than that necessary to rotate the valve to its closed position. In this construction, it will be seen that the lock washers 44 maintain and urge the valve head 13 against its seat 15 at all times when the valve is in its closed position, but, at the same time, will compensate for any expansion of the parts due to the heat to which the valve is subjected.

On the inner end of the nut-like member 36, there is provided an annular tapered or beveled portion 45 which cooperates with a similar annular tapered portion 46 arranged on the outer end of the bore of the outer part 5 of the body member which are similar to the tapered portions 27 and 28, respectively, of the preferred construction and are provided for the same purpose. It will be seen that when the valve stem is moved to its fully open position, that the tapered surfaces 45 and 46 cooperate with each other to seal the space around the valve stem so as to prevent leakage of the gases therearound. Also, while the resilient member 44 will tend to urge the tapered surfaces 45 and 46 together, the parts are permitted to move relative to each other in case the parts of the valve contract upon cooling, as in the preferred construction.

By providing a valve of such construction, it will be seen that the valve when moved either to its fully open or closed position will be constantly urged to its seat so as to prevent escapement of the gases, and, at the same time, will permit the valve parts to expand or contract without subjecting the same to undue strain thereby eliminating any danger of damaging the valve parts. Furthermore, it will be seen that in such a construction, that the valve will never be locked so tightly in position so that it cannot be manipulated. This is due to the flexible or yieldable connection provided by the resilient members 34 and 44 which, at all times, permits the valve stem to yield relative to the body member. It will also be seen that the improved valve of my invention can be made of parts which can be easily and conveniently machined without the necessity of employing expensive or special equipment. Also, it will be seen that my improved valve can be easily and quickly assembled and maintained without the aid of special tools and that any part thereof can be conveniently replaced.

While I have shown and described several embodiments of my invention, it will be understood that these embodiments are merely for the purpose of illustration and description and that various other forms may be devised within the scope of my invention, as defined in the appended claims.

I claim:

1. A valve of the class described comprising a body member having an opening arranged therein through which fluid is adapted to pass, a valve stem carried by said body member which is movable relative thereto and communicates with said opening to open and close the same said valve stem and body member being constructed and arranged so as to provide a passageway for the fluid through said body member, a valve head arranged on the inner end of said valve stem, said body member having a valve seat carried thereby in said opening with which said valve head cooperates to close the valve, means arranged on the opposite end of said valve stem for manipulating the same to open and close the valve, and resilient means arranged between said manipulating means and said body member so as to provide a yieldable connection between the valve stem and said body member whereby the same are permitted to move relative to each other in case of expansion or contraction of the valve parts when the valve stem is either in its fully open or closed position thereby preventing excessive locking of and consequent damage to the valve.

2. A valve of the class described comprising a body member having an opening arranged therein through which fluid is adapted to pass, a valve stem carried by said body member which is movable relative thereto and communicates with said opening to open and close the same said valve stem and body member being constructed and arranged so as to provide a passageway for the fluid through said body member, a valve head arranged on the inner end of said valve stem, said body member having a valve seat carried thereby in said opening with which said valve head cooperates to close the valve, a rotatable hand wheel carried by said body member and connected to said valve stem for manipulating the same to open and close the valve, and resilient means arranged between said hand wheel and said body member so as to provide a yieldable connection between the valve stem and said body member whereby the same are permitted to move relative to each other in case of expansion or contraction of the valve parts when the valve stem is either in its fully open or closed position thereby preventing excessive locking of and consequent damage to the valve.

3. A valve of the class described comprising a body member having an opening arranged therein through which fluid is adapted to pass, a valve stem carried by said body member which is movable relative thereto and communicates with said opening to open and close the same said valve stem and body member being constructed and arranged so as to provide a passageway for the fluid through said body member, a valve head arranged on the inner end of said valve stem, said body member having a valve seat carried thereby in said opening with which said valve head cooperates to close the valve, and a rotatable hand wheel carried by said body member and connected to said valve stem for manipulating the same to open and close the valve, said hand wheel being constructed and arranged so as to be inherently resilient so that the valve stem and body member are yieldable relative to each other whereby the same are permitted to move relative to each other in case of expansion or contraction of the valve parts when the valve stem is either in its open or closed position thereby preventing excessive locking of and consequent damage to the valve.

4. A valve of the class described comprising a tubular body member, a tubular valve stem arranged through said body member for reciprocable movement therein, a valve head arranged on one end of said valve stem, said body member having a valve seat carried thereby with which said valve head cooperates to close the valve, said valve stem having at least one port hole arranged through the wall thereof at a point adjacent said valve head communicating with the hollow interior of said valve stem through which the fluid is adapted to pass, rotatable means connected to said valve stem for manipulating the same, and resilient means arranged between said rotatable means and said body member so as to provide a yieldable connection between said valve stem and said body member whereby the same are permitted to move relative to each other in case of expansion or contraction of the valve parts when the valve stem is either in its fully open or closed position thereby preventing excessive locking of and consequent damage to the valve.

5. A valve of the class described, as defined in claim 4, including a member carried by the valve stem intermediate the length thereof having an annular tapered surface thereon which cooperates with a similar annular tapered surface carried by the body member so as to seal the space between the valve stem and the body member whereby leakage is prevented therebetween when the valve stem is moved to position to fully open the valve.

6. A valve of the class described comprising a tubular body member, a tubular valve stem arranged through said body member for reciprocable movement therein, a valve head arranged on one end of said valve stem, said body member having a valve seat carried thereby with which said valve head cooperates to close the valve, said valve stem having at least one port hole arranged through the wall thereof at a point adjacent said valve head communicating with the hollow interior of said valve stem through which the fluid is adapted to pass, a rotatable member connected to said valve stem for manipulating the same, said body member having a circumferential groove arranged therearound intermediate the length thereof, an annular resilient member arranged around said body member with the inner periphery thereof disposed in said groove, means arranged between said rotatable member and said annular resilient member whereby any longitudinal movement of said rotatable member will be transmitted to said annular resilient member when the valve stem is either in its fully open or closed position so as to provide a yieldable connection between said valve stem and said body member whereby the same are permitted to move relative to each other in case of expansion or contraction of the valve parts thereby preventing excessive locking of and consequent damage to the valve.

7. A valve of the class described comprising a tubular body member consisting of two interconnected parts, a tubular valve stem arranged in said body member for reciprocable movement therein, a valve head arranged on one end of said valve stem which cooperates with a valve seat arranged on that end of said body member, said valve stem having at least one port hole arranged through the wall thereof at a point adjacent said valve head through which the fluid is adapted to pass, said valve stem extending through and beyond both parts of said body member, connecting means arranged on the extending portion of said valve stem beyond said body member, rotatable means connected to said valve stem for manipulating the same, and resilient means arranged between said rotatable means and said body member so as to provide a yieldable connection between said valve stem and said body member whereby the same are permitted to move relative to each other in case of expansion or contraction of the valve parts when the valve stem is either in its fully open or closed position thereby preventing excessive locking of and consequent damage to the valve.

8. A valve of the class described, as defined in claim 7, wherein the resilient means arranged between the rotatable means and the body member so as to provide a yieldable connection between the valve stem and the body member consists of an annular resilient member disposed around the body member with the inner periphery thereof positioned in a circumferential space arranged around the body member between the two interconnected parts thereof.

9. A valve of the class described, as defined in claim 7, including an interiorly threaded member arranged on the extending portion of the valve stem beyond both parts of said body member and having an annular tapered surface on the inner end thereof which cooperates with a similar annular tapered surface arranged on the adjacent end of said body member so as to seal the space between the valve stem and the body member whereby leakage is prevented therebetween when the valve stem is moved to position to fully open the valve.

10. A valve of the class described comprising a tubular body member, a tubular valve stem arranged in said body member for reciprocable movement therein, a valve head arranged on one end of said valve stem which cooperates with a valve seat arranged on that end of said body member, said valve stem having at least one port hole arranged through the wall thereof at a point adjacent said valve head through which the fluid is adapted to pass, said valve stem extending through and beyond said body member with said extending portion being exteriorly threaded, an exteriorly threaded member arranged on the threaded extending portion of said valve stem, an interiorly threaded member arranged on the exteriorly threaded portion of said last mentioned member and which cooperates therewith to move the valve stem, and resilient means arranged between said last mentioned member and said body member so as to provide a yieldable connection between said valve stem and said body member whereby the same are permitted to move relative to each other in case of expansion or contraction of the valve parts when the valve stem is either in its fully open or closed position thereby preventing excessive locking of and consequent damage to the valve.

11. A valve of the class described, as defined in claim 10, including an annular tapered portion arranged on the inner end of the exteriorly threaded member which cooperates with a similar annular tapered portion arranged on the outer end of the body member so as to seal the space between the valve stem and the body member whereby leakage is prevented therebetween when the valve stem is moved to position to fully open the valve.

12. A valve of the class described comprising a tubular body member consisting of two parts, a tubular valve stem arranged in said body member for reciprocable movement therein, a valve head arranged on one end of said valve stem which cooperates with a valve seat arranged on that end of said body member, said valve stem having at least one port hole arranged through the wall thereof at a point adjacent said valve head through which the fluid is adapted to pass, said valve stem extending through and beyond both parts of said body member with said extending portion being exteriorly threaded, an exteriorly threaded member arranged on the exteriorly threaded portion of said valve stem, an interiorly threaded member arranged on the exteriorly threaded portion of said last mentioned member and which cooperates therewith to move the valve stem, the two parts of said body member being connected together so as to provide a circumferential space therebetween around the body member, an annular resilient member disposed around said body member with the inner periphery thereof positioned in said circumferential space and connected to said interiorly threaded member so as to provide a yieldable connection between said valve stem and said body member whereby the same are permitted to move relative to each other in case of expansion or contraction of the valve parts when the valve stem is either in its fully open or closed position thereby preventing excessive locking of and consequent damage to the valve.

13. A valve of the class described, as defined in claim 12, wherein the interiorly threaded member consists of a rotatable hand wheel for manipulating the valve whereby upon rotative movement thereof the valve stem is moved reciprocably in the body member, and including means for preventing rotative movement of the valve stem relative to said body member when said hand wheel is rotated to manipulate the valve, and means for connecting the annular resilient member to said rotatable hand wheel so as to be rotatable therewith.

14. A valve of the class described, as defined in claim 12, including means for connecting the interiorly threaded member to the body member so as to permit a limited longitudinal movement therebetween and to prevent rotative movement relative to each other when the valve stem is manipulated to open or close the valve with said valve stem adapted to be rotated to open or close the valve.

WILLIAM J. KIENE.